3,163,517
METHOD OF PREPARING A SOIL CONDITIONING COMPOSITION FROM SUGAR CANE BAGASSE
Harry M. May, 1717 E. Northside Drive, Jackson, Miss., and Harry A. Nadler, Jr., Rte. 2, Box 117, Thibodaux, La.
No Drawing. Filed Jan. 14, 1963, Ser. No. 251,032
7 Claims. (Cl. 71—26)

This invention relates to a composition for conditioning the soil environment of plants so that the rate and uniformity of growth of the plants is improved. In a different aspect, the invention relates to a process for upgrading natural materials yielded as wastes or low-value by-products in the production of cane sugar.

In the production of cane sugar, the cane is compressed or crushed to express or extract therefrom the juices containing the raw sugar. The cane stalks are crushed into straw or cream colored particles termed bagasse which include more or less equal proportions of moisture and fibers or insoluble solids, and relatively small quantities of various soluble solids. While the general composition of the bagasse varies somewhat according to the particular variety of sugar cane from which it is derived and the area where it is produced, a typical composition of bagasse derived from Louisiana sugar cane is about 49 to about 54 percent by weight moisture, about 45 percent by weight insoluble fibers, and about 6 percent by weight soluble solids.

The water insoluble fibers of the bagasse is comprised largely of cellulose, pentosans (a type of hemi-cellulose), and lignin. The ratio of these components is roughly 56 percent by weight cellulose, 25 percent by weight pentosans and 19 percent by weight lignin.

The insoluble fibers of the bagasse include two basically different structural types. One of these is composed of the relatively tough, hard-walled cylindrical cells found in the rind and vascular tissues of the cane. The other is composed of the soft, thin-walled, irregularly shaped cells of the inner stalk tissue of pith. These two constituents of the fiber occur in the general ratio of about 2 to 1 by weight, respectively.

Both of the fiber types have a chemical composition, on a dry basis, of about 0.21 percent nitrogen, 0.09 percent phosphorus (phosphorus pentoxide equivalent), 0.21 percent potash ($K_2O$ equivalent) and about 40 percent carbon. The raw bagasse is acidic in nature having a pH of 4.05 to 5.2.

The "bright" or sugar rendered bagasse has heretofore been used primarily as a mulch or ground cover in poultry houses or similar areas, and efforts to use the material as a soil conditioner have met with little success. Because of its relatively high carbon to nitrogen ratio, the bagasse tends to rob the soil of nitrogen, thereby stunting plant growth. Moreover, the chemical constitution of the cream colored bagasse is unstable, and continued bacterial action from the time of rendering to the time of application of the bagasse to the soil causes its effect as a soil conditioner to be unpredictable and its compatibility with various types of soil over extended periods of time to be a matter of conjecture. Also, the chemical consistency or uniformity of the bagasse as usually handled is poor in that substantial variations in carbon to nitrogen ratio and plant nutrient content are experienced even within the same lots of this material. The material's physical non-uniformity also gives rise to improper drainage of the soil with which it is mixed, and insufficient aeration of the roots of plants growing in such soil. The acidic nature of the bagasse renders it unsuitable for use in some types of soil, particularly in the case of plants requiring an alkaline or near neutral soil. Lastly, the cream color of the bagasse seldom blends in well with the soil, but instead generally identifies the bagasse as a rather unsightly additive to the area treated.

It is proposed by the present invention to convert rendered or "bright" bagasse to a valuable and highly useful soil conditioner which does not deleteriously affect the soils to which it is added and which is generally free of the disadvantages hereinbefore enumerated. The process to which the bagasse is subjected to achieve such conversion generally comprises increasing the moisture content of the raw bagasse to above about 60 percent and preferably from 70 to 80 percent (to a substantially saturated state) by adding water thereto, mechanically compressing the bagasse while the bagasse is being stacked in outdoor piles exposed to the elements, permitting the compressed bagasse to remain in such outdoor piles for a period of at least 70 days, during which time it is weathered and undergoes enzymatic and bacteriological conversion, then dehydrating the weathered bagasse to a moisture content of from about 10 percent by weight to about 40 percent by weight, classifying the dehydrated particles of the weathered bagasse to obtain relatively uniform particle sizes by separating out small pith and small fiber particles, and finally, enriching and chemically balancing this residue by the addition of plant nutrients to the physically uniform bagasse particles.

An important aspect of the present invention is my discovery that the raw bagasse may be changed from a chemically non-uniform and unstable material of undesirably high carbon to nitrogen ratio and undesirably low pH to a material of uniform and a stable chemical constitution, an improved C–N ratio and near neutral pH by the process of increasing the water content of the bagasse and then compacting the bagasse in large outdoor piles where it is permitted to remain for a period of at least 70 days. Though this procedure may be suggestive of heretofore known composting or silage producing techniques, the bacterial or enzymatic action which occurs in the piles of weathering bagasse is unlike that which occurs in composting or silage production in that the sugar and acids which constitute the predominance of the 6 percent by weight soluble solids in the bagasse appear to be spent, and after 70 days, all observable chemical activity appears to be arrested and stability obtained. Bagasse subjected to this treatment has substantially the same chemical content after two to three years as it does after the 70-day weathering period. Though some outdoor weathering of the raw bagasse has heretofore been practiced for other purposes, and primarily by reason of lack of convenient indoor storage, the effect of such weathering and the value of moisture saturation and mechanical compression is chemically stabilizing the bagasse and in improving its pH and C–N ratio have not, to our knowledge, been previously appreciated.

By virtue of the chemically stable base which is constituted by the treated bagasse and its satisfactory C–N ratio and near neutral pH, its content of plant nutrients, such as nitrogen, phosphorus and potash, can be built up or adjusted to an optimum level by the uniform addition of suitable inorganic chemicals thereto. Addition of nitrogen-containing chemicals thereto may be employed to further reduce the C-N ratio to an optimum level to assure orderly activity of soil organisms and the deposition of a relatively large amount of rich residual humus as the soil conditioner is further decomposed by soil bacteria. Tests of the soil conditioner composition of the invention have effectively demonstrated that it is superior to peat moss in promoting rapid and uniform plant growth.

From the foregoing general summary of the invention, it will have become apparent that a major object of the invention is to provide an effective soil conditioning composition which is versatile in its applicability to use in different types of soil and which produces more uniform plant growth in the soils to which it is applied.

Another object is to upgrade raw bagasse by converting it to a highly useful soil conditioning composition.

A more specific object of the invention is to convert sugar cane bagasse to a soil conditioning composition having a balanced plant nutrient value, a near neutral pH and a C-N ratio which avoids disorderly activity by soil organisms.

A further object of the invention is to provide a chemically balanced, effective soil conditioner of uniform physical particle sizes, which soil conditioner is derived from sugar cane bagasse.

A further object of the invention is to provide a simple and relatively economical process for treating raw sugar cane bagasse to convert the material to a composition which is a highly effective soil conditioning agent.

In addition to the foregoing objects and advantages, additional advantages of the present invention will become apparent as the following detailed description of the invention is read.

The raw, cream colored bagasse which constitutes the starting material used in the process of the present invention contains (on a dry basis), as has been indicated, a nitrogen content of from about 0.18 percent by a weight to about 0.21 percent by weight, a phosphorus (expressed as $P_2O_5$) content of from about 0.05 percent by weight to about 0.09 percent by weight, a potash content (expressed as $K_2O$) of from about 0.18 percent by weight to about 0.21 percent by weight, and a carbon content of approximately 40 percent by weight. The C-N ratio of this material therefore varies from about 220-1 to about 190-1. These values are average values since the chemical constitution of the raw bagasse is not uniform throughout the mass, but may vary considerably within, and even to some extent outside, the specified limits.

Depending upon the extent of dehydration occurring in the sugar cane rendering process and subsequent exposure to moisture, the raw bagasse may contain from 49 percent to about 54 percent water. It is a bright cream color and its particle size ranges from fine powder or dust to elongated coarse fibers several inches in length. Its pH is between about 4.05 and 5.2.

In accordance with the process of the present invention, the bagasse, following sugar rendering, is conveyed to fields and stacked in piles which are preferably about 100 feet in length by 200 feet in width and about 2 feet in depth. The piles may, however, be considerably smaller or as large as 500 feet in both length and width and 3 feet in depth. It is sprayed with water while being conveyed or while being stacked to introduce to the bagasse all the water which it is capable of accepting, which is generally at least 60 percent by weight, and is usually in the range of from 70 to 80 percent by weight. In other words, an amount of moisture is added to the particulate bagasse which is sufficient to saturate the material to the point where any additional water will drain off the stacked bagasse onto the ground. After the pile of bagasse having the specified dimensions has been moistened in the manner prescribed, a second layer of slightly lesser length and width is stacked on top of the first layer and is also approximately 2 feet in depth. Moistening of this layer of the bagasse in the same manner as the first layer is then carried out. Prior to the stacking of the second layer of bagasse on the first layer thereof, the first layer is mechanically compacted or compressed by driving thereover a heavy vehicle, such as a bulldozer, steamroller or other device of suitable weight. We have realized good success utilizing a 16-ton bulldozer for effecting the compaction of the mass of raw bagasse. This type mechanical compression amounts to imposing a pressure of from about 5 p.s.i.g. to about 10 p.s.i.g. upon the stacked bagasse.

The procedure of adding 2-foot layers of the bagasse to the base structure followed by moisturizing, if not moisturized while conveying to the stack, followed by compaction, is repeated until seven to ten layers are superimposed and the total depth of the pyramidally-shaped piles is from about 14 to 20 feet.

After formation of the compacted, moisturized piles of bagasse in the manner described, the material is permitted to weather for a period of at least 70 days. The precise nature of bacterial and enzymatic action which occurs in the piles of bagasse during this period is not exactly and completely understood. It is believed, however, to be primarily an anaerobic process since the circulation of air to the interior of the piles is predominantly prevented by the particle size and extent of compression of the material. Apparently the effects of moisture saturation and compression, combined with the presence of sugar residues and certain acidic materials, result in highly exothermic enzymatic and bacterial action which continues over the period of weathering which in turn results in the substantially complete depletion of the sugar and acid content of the bagasse.

In any event, it has been observed that, following the 70-day period of weathering and digestion, a marked change has occurred in the chemical character of the material and some change is also detectable in its physical properties. Thus, the 70-day period of curing tends to separate some of the pith granules from the fibrous rind particles as a result of breakdown in the cellulosic bonds between the two materials. The color of the material has changed frm its initial cream color to a medium brown, and the pH has been increased to the nearly neutral range of from about 6.3 to about 6.8. Very little or no free sugar or organic acid remains in the bagasse, and the nitrogen content is appproximately doubled to a value of between about 0.38 percent by weight and about 0.45 percent by weight. The carbon content of the material remains about 40 percent. This results in an effective reduction of the carbon to nitrogen ratio of from about 200 to 1 in the original unweathered material to about 100 to 1 in the weathered product. Phosphorus, expressed as phosphorus pentoxide, is increased to a content of between 0.09 percent by weight and 0.17 percent by weight, and the potash ($K_2O$ equivalent) content of the material is increased to between about 0.28 percent by weight and 0.40 percent by weight. It may be appropriately stated at this point that all references to the phosphorus and potash content of bagasse appearing in the specification and appended claims of this application indicate these values as they are expressed as phosphorus pentoxide and potassium oxide as is customary in the chemical analysis of fertilizers, soil conditioners and the like.

It should be pointed out that in the course of weathering the compressed bagasse in the manner described, a portion of the insects which infest the bagasse, as well as grass and weed seeds entrained therein, are destroyed. The destruction of this undesirable animal and plant life occurs as a result of the high temperatures generated in the mass of the piles by the exothermic enzymatic and bacterial action, and by the lack of air circulation through the pile.

In summary, the initial step of moisturizing, compacting and weathering the bagassee results in an increase in the weight percent of beneficial nutrient materials in the bagasse, a reduction in the carbon to nitrogen ratio, an increase in the pH level of the material, an adjustment of chemical constitution to a more uniform level throughout the mass, a stabilization of bacteriological and enzymatic action that substantially constant and unchanging chemical composition can be predicted over extended periods of time, and the destruction of a portion of the undesirable animal and plant life which infests the bagasse prior to such treatment.

In the broad description of the invention set forth in the initial part of this specification, it has been indicated that following the weathering period, the bagasse is dehydrated to a moisture content of from about 10 to about 40 percent by weight. In a preferred embodiment of the invention, the dehydration of the weathered bagasse is accomplished in a two-phase operation. Initially, the weathered bagasse is conveyed into a haydraulic squeezing press where the moisture content is mechanically reduced to around 60 percent by weight. The bagasse is then passed through a direct fired, rotary flash dryer where it is dehydrated to a final moisture content of between about 10 and 40 percent by weight. The input side of the rotary dryer is maintained at a temperature of from about 1300° F. to about 1900° F., and preferably about 1800° F., and the output in the discharge side of the dryer at a temperature of from about 180° F. to about 250° F., and preferably from 190° F. to 220° F. Passage through the dryer at the preferred temperatures results in the destruction of any remaining insects and weed or grass seeds which may infest the bagasse and simultaneously reduces the moisture content to the desired level. In most instances, it will be preferred to reduce the moisture content to between about 300 percent by weight and 40 percent by weight. However, the final moisture content which is selected will depend upon the method of packaging employed, and the requirements of the user or consumer to whom the product is to be marketed. If the product is to be baled, a moisture content of about 10 percent by weight is generally most suitable. On the other hand, where the product is to be compressed into polyethylene lined bags, a moisture content of from 30 to 40 percent is preferred. Homeowners and amateur gardeners generally prefer a soil conditioning material which is characterized by a moisture content of from 25 to 35 percent so that the material is ready for immediate use and not so dry as to present a dust problem. On the other hand, some commercial users may prefer a moisture content as low as 10 percent or slightly higher. In any event, the control which can be obtained with the rotary dryer permits any desired moisture content within the broad specified range to be obtained without difficulty.

After the bagasse has been dehydrated by passage through the hydraulic press and rotary dryer, it is passed through dust collectors and on to vibrating screens where the particles are classified for the purpose of improving uniformity of particle sizes and imparting the optimum physical character to the product for purposes of water retention and air circulation when mixed with the soil. In the screening step of the procedure, the small particles which are primarily derived from the pith of the sugar cane stalks are largely separated from the long fibrous material. The screens employed may suitably be Tyler Standard Screen Sieves and the classification of the bagasse particles is preferably such that the maximum size of the particles in the final product permits all of the particles to pass a No. 4 screen (0.185 inch diameter openings), 50 percent of the particles to be retained between a No. 5 screen and a No. 14 screen, and the remaining 50 percent of the particles to be distributed between a No. 16 screen (0.039 inch diameter) and a No. 35 screen (0.0164 inch diameter). Few or none of the particles retained in the product will pass the No. 35 screen. By screening the dehydrated bagasse in the manner described, a physically uniform product is obtained which does not compact the soil around the roots of the plants growing therein, affords improved water drainage while giving optimum water retention, and permits the soil to be sufficiently loose that the roots of the plant are sufficiently aerated.

The final step of the process of the invention constitutes the addition to the dehydrated, classified bagasse of certain inorganic chemical materials which boost the nutrient content of the stabilized bagasse and further lower the carbon-nitrogen ratio thereof. As a result of the essentially neutral hydrogen ion concentration of the added materials, the pH of the bagasse is not substantially changed by the addition of such chemicals. However, judicious selection of the nutrient containing chemicals which are added to the material can result in a slight adjustment of pH to more nearly bring this parameter to a neutral value of 7, if desired. In most instances, however, the pH of 6.3 to 6.8 which is attained prior to the addition of the nutrients will prove sufficiently neutral to permit use of the bagasse in practically every type of soil.

The addition of the plant nutrient containing chemicals to the dehydrated classified bagasse may conveniently be accomplished by passing the material through agitating rotary conveyors between mechanical spraying equipment which sprays the nutrient containing additives into the bagasse at a controlled rate which is synchronized with the rate of movement of the bagasse by the conveyors. Blending of the added chemicals with the dehydrated stabilized bagasse material occurs through the continued conveyor agitation and as a result of the residual heat of approximately 110° F. remaining in the material as a result of dehydration in the rotary dryer.

The nutrients are preferably applied to the stabilized bagasse as a single-phase solution and it is preferred to use a nutrient solution which will result in a product having a nitrogen content of between 0.60 and 1.50 percent by weight, a phosphorus pentoxide (equivalent) content of between 0.30 and 1.00 percent by weight and a potash (equivalent) content of between 0.45 and 1.00 percent by weight. The most preferred final nutrient range of the product is from about 0.90 to about 1.10 percent by weight nitrogen, from about 0.45 to about 0.65 percent by weight phosphorus pentoxide and from about 0.45 to about 0.65 percent by weight potash. We have obtained good results using a non-pressure stable aqueous solution containing 10 percent by weight phosphorus pentoxide, 2.5 percent by weight potassium oxide and 15 percent by weight nitrogen. The nitrogen sources in the solution are ammonium phosphate, ammonium nitrate and urea. The solute which contributes the potash is potassium chloride.

Since the carbon content of the stabilized bagasse is not changed by the addition of the nutrient containing inorganic solution, the increase in the nitrogen content of the material effectively reduces the carbon to nitrogen ratio to about 40 to 1. Although this carbon to nitrogen ratio is slightly higher than is most often conceived to be optimum to completely eliminate robbing of nitrogen from the soil by soil organisms, the slight insufficiency of nitrogen indicated by the 40 to 1 carbon to nitrogen ratio is offset by the amount of the nitrogen which is present in readily available form. This relatively high concentration of readily available nitrogen is attained by virtue of the ready availability which characterizes the inorganic nitrogen added in the last step of the process to the stabilized bagasse. The same characteristic of availability characterizes the other nutrients, such as phosphorus and potash, which are added to the stabilized bagasse in inorganic form. The 40 to 1 carbon to nitrogen ratio is sufficiently low, however, to leave a substantial amount of beneficial humus upon further bacteriological decomposition of the soil conditioner over extended periods of time after it has been mixed with the soil.

We have further determined that when the nitrogen content of the finished material is adjusted to fall within the specified range, there is no problem of having an excessively large amount of nitrogen present in the material so as to overstimulate the soil organisms, causing them to produce excessive amounts of ammonia and thus create an injurious environment for plant life. It may also be noted that nitrogen which is present in the stabilized bagasse prior to the addition of the readily available inorganic nitrogen is relatively more tightly bound chemically in the bagasse structure, and therefore is sufficiently slow releasing to enable the finished product to continue to supply nitrogen to beneficial soil organisms over an extended period of time.

In summary, the amount of readily available nitrogen which is added to the stabilized bagasse, the slowly releasable nitrogen which is present in the stabilized bagasse before such addition, and finally, the near optimum carbon to nitrogen ratio of the finished material all assure continuous orderly activity of beneficial soil organisms over extended periods of time to the end that the plants growing in soil which has been treated with the soil conditioner of the invention receive a constant and uniform supply of nutrients throughout their normal life span.

As an additional measure which may be added to the process for the purpose of insuring retention of the moisture content of the finished soil conditioner product at the desired level, the material may be hydraulically compressed into bags which are lined on the inside and outside with polyethylene so as to minimize moisture loss during transhipment. In this way, a maximum moisture loss of about 10 percent from the time of bagging until the time of ultimate use can be assured and the product thus made available in a slightly moist, dust-free form.

The finished product consists of approximately 98 percent organic material with the remainder constituting inorganic material present primarily as a result of the introduction of the nutrients in the manner described.

Tests of the stabilized bagasse soil conditioner prepared by the process of the present invention indicate that the material yields a definite improvement in plant growth in soils to which it is added, and that the material is, in every instance, at least as good or effective as peat moss and, in most instances, considerably better. The following example is typical of tests conducted to determine the effectiveness of the soil conditioner of the invention.

EXAMPLE OF PRODUCT TESTING

Both clay loam and sandy loam soil types were used in a field test of the improved soil conditioner of the invention. As a control for the tests, some soil plots were treated with equal amounts of peat moss and other soil plots were left untreated. The pH of all plots was balanced by using hydrated lime on the peat moss plots and gypsum on the bagasse and soil plots. These materials were distributed on the soil at the rate of 5 pounds per hundred square feet of soil. All the plots were fertilized with a commercial fertilizer containing 8 percent by weight nitrogen, 8 percent by weight phosphorus and 8 percent by weight potash at the rate of 1200 pounds per acre.

The test plants employed were tomatoes and chrysanthemums. The relative effectiveness of the peat moss and the soil conditioner of the present invention as compared to each other and to the untreated soil was determined by measuring the total fresh weight of plant growth after equal periods of growth. The field plots upon which the soil conditioner of the present invention were employed were equally divided so that one-half of the plots were conditioned at a rate of one part soil conditioner to three parts of soil and the remaining half of the plots were conditioned at the rate of one part soil conditioner to two parts of soil.

Planting for the test was completed in mid-May. In late June, the tomatoes which were planted in all of the clay loam soil plots contracted a bacterial disease and were therefore removed and the plots replanted with fall-maturing tomato plants. In July, the tomatoes in the sandy loam soil plots had matured and were cut and the fresh weight measured. In late August, the replanted fall tomato plants and also the chrysanthemums from both the sandy loam soil plots and the clay loam soil plots were harvested. The fresh weight of these plants was measured. Measurement of fresh weight attained in all of the plants indicated that the plants grown in both the clay and sandy loam soils and conditioned with the stabilized enriched bagasse soil conditioner of the present invention were significantly superior to those grown in peat moss treated soil and in untreated soil. The improvement in growth of the chrysanthemums which was effected through the use of the soil conditioner of the invention was not so striking as in the case of the tomatoes, but this was thought to be attributable to the fact that chrysanthemums are slower maturing plants than tomatoes and it is probable that a longer growth period for the chrysanthemums would have yielded results which more clearly demonstrated the greater effectiveness of the soil conditioner of the invention. The results of the test are tabulated in Tables 1 and 2.

Table 1
COMPARATIVE TESTS IN CLAY LOAM SOIL

| Treatments | Mean Total Growth in Pounds | |
| --- | --- | --- |
| | Tomatoes | Chrysanthemums |
| Bagasse Soil Conditioner | 19.15 | 3.60 |
| Peat Moss | 12.90 | 3.58 |
| Soil | 12.72 | 3.06 |

Table 2
COMPARATIVE TESTS IN SANDY LOAM SOIL

| Treatments | Mean Total Growth in Pounds | |
| --- | --- | --- |
| | Tomatoes | Chrysanthemums |
| Bagasse Soil Conditioner | 32.03 | 4.56 |
| Peat Moss | 26.93 | 4.38 |
| Soil | 28.30 | 3.84 |

From the foregoing description of the invention, it will be apparent that the present invention provides a relatively simple and economical process for converting sugar cane bagasse to a highly valuable soil conditioner. The soil conditioner product which results from the process of the invention closely approaches, in having the following properties, the definition of an ideal soil conditioner which horticulturists have established:

(1) *Physical.*—The soil conditioner has a uniform, relatively small particle size which affords uniform soil aeration, drainage and water retention. Compaction of the soil mixed with the soil conditioner around the roots of the plant is avoided.

(2) *Chemical.*—The composition is chemically uniform throughout and contains a balance of plant nutrients and protein building nitrogen for use by soil organisms which is near optimum. The nitrogen availability and carbon to nitrogen ratio which characterize the product are excellent from the standpoint of promoting soil organism activity and maintaining an orderly conversion of the organic material of the product to soil organism metabolistic energy. The product undergoes decomposition over an extended period of time forming rich humus, and avoids nitrogen depletion of the soil as a result of soil robbing by the soil bacteria. The material has a near neutral pH to permit its use upon both acidic and alkaline soils.

(3) *User benefits.*—The composition is free of extremely fine particles or dust which would constitute a health problem or handling nuisance to the user, and all weed seeds and insects which infest the raw bagasse have been destroyed in the curing and dehumidifying process. The color of the finished material is medium brown so that the material blends well with most types of soil and does not detract from the appearance of the soil.

Although certain preferred embodiments of the invention have been hereinbefore described as exemplary of its practice, it will be understood and appreciated by those skilled in the art that certain modifications and innovations may be indulged in the prescribed procedure and types of materials used without departure from the basic principles underlying the invention. It is therefore intended that insofar as the production of a soil conditioning material from bagasse continues to rely upon the fundamental novel concepts which are herein presented, the introduction to the practice of the process of such modifications and innovations shall not serve to remove such practice from the pale of the spirit and scope of the invention except as the same may be limited by the appended claims or reasonable equivalents thereof.

We claim:

1. The method of preparing a soil conditioning composition from sugar cane bagasse which comprises:
   (a) weathering bagasse having a moisture content of between about 60 percent by weight and 90 percent by weight in compacted outdoor piles for a period exceeding 70 days;
   (b) dehydrating the weathered bagasse to a moisture content of between about 10 percent by weight and 40 percent by weight;
   (c) classifying the dehydrated weathered bagasse to separate a portion of the bagasse having particles, substantially all of which will pass a No. 4 Tyler Standard Screen Sieve and be retained on a No. 35 Tyler Standard Screen Sieve; and
   (d) adding inorganic, plant nutrient containing chemicals selected from the group consisting of nitrogenous compounds, phosphorus containing compounds, potassium containing compounds and mixtures of said compounds to said separated portion of the bagasse to adjust the chemical content thereof on a dry basis to about 98 percent by weight organic material, about 0.6 to 1.50 percent by weight nitrogen; about 0.30 to 1 percent by weight phosphorus pentoxide, and about 0.45 to about 1 percent by weight potash.

2. The method claimed in claim 1 wherein said outdoor piles are approximately 100 feet in length, 200 feet in width and 20 feet in depth.

3. The method claimed in claim 1 wherein the bagasse is saturated with water before weathering.

4. The method claimed in claim 1 wherein said dehydration of the weathered bagasse is accomplished by
   (a) compressing the bagasse to express water therefrom until the moisture content of the bagasse does not exceed 60 percent by weight; and
   (b) passing the bagasse through a heated zone graduated from a temperature of about 1880° F. at the entrance side of said zone to about 200° F. at the exit side of said zone whereby plant and animal life in the bagasse is destroyed.

5. The method claimed in claim 1 wherein the compaction of said outdoor piles is accomplished by spreading the bagasse in a layer having a depth of about two feet and applying a pressure of about 5 to 10 pounds per square inch gauge to the upper surface thereof, then superimposing additional layers of two foot depth upon the first layer with the superimposition of each layer being followed by application of the described pressure until the total depth of said pile exceeds about 14 feet.

6. The method of preparing a soil conditioning composition from sugar cane bagasse which comprises:
   (a) increasing the moisture content of the bagasse to from about 60 percent by weight to about 80 percent by weight;
   (b) placing the bagasse of increased moisture content in compact outdoor piles made by
      (1) spreading the bagasse in a layer having a depth of about 2 feet and applying a pressure of about 5 to 10 pounds p.s.i.g. to the upper surface thereof, then
      (2) superimposing additional layers of 2 foot depth upon the first layer with the superimposition of each layer being followed by application of the described pressure until the total depth of the pile exceeds about 14 feet;
   (c) weathering the bagasse in said compact outdoor piles for a period of at least 70 days;
   (d) compressing the weathered bagasse to express water therefrom until the moisture content of the bagasse is about 60 percent by weight;
   (e) passing the bagasse through a heated zone graduated from a temperature of about 1880° F. at the entrance side of said zone to about 200° F. at the exit side of said zone whereby plant and animal life in the bagasse is destroyed, and the moisture content of the bagasse is reduced to between about 10 percent by weight and about 40 percent by weight;
   (f) classifying the dehydrated, weathered bagasse to separate a portion of the bagasse having a particle size such that the majority of the separated portion will pass a No. 4 Tyler Standard Screen Sieve and be retained on a No. 35 Tyler Standard Screen Sieve; and
   (g) adding inorganic, plant nutrient-containing chemicals to said separated portion to adjust the chemical content thereof on a dry basis to about 98 percent by weight organic material, about 0.60 to 1.50 percent by weight nitrogen, about 0.30 to 1.00 percent by weight phosphorus pentoxide and about 0.45 to 1.00 percent by weight potash.

7. The method of preparing a soil conditioning composition from sugar cane bagasse which comprises:
   (a) increasing the moisture content of the bagasse to from about 60 percent by weight to about 80 percent by weight;
   (b) placing the bagasse of increased moisture content in compact outdoor piles made by
      (1) spreading the bagasse in a layer having a depth of about 2 feet and applying a pressure of about 5 to 10 p.s.i.g. to the upper surface thereof, then
      (2) superimposing additional layers of 2 foot depth upon the first layer with the superimposition of each layer being followed by application of the described pressure until the total depth of said pile exceeds about 14 feet;
   (c) weathering the bagasse in said compacted outdoor piles for a period exceeding about 70 days and until the pH of the weathered bagasse exceeds about 6.3 and the carbon to nitrogen ratio of the weathered bagasse does not exceed 100:1;
   (d) compressing the weathered bagasse to express water therefrom until the moisture content of the bagasse does not exceed 65 percent by weight;
   (e) passing the bagasse through a heated zone to destroy undesirable plant and animal life in the bagasse and to reduce the moisture content thereof to between about 10 percent by weight and 40 percent by weight;
   (f) classifying the dehydrated, weathered bagasse to separate a portion of the bagasse having a particle size range such that a major portion of the bagasse will pass a No. 4 Tyler Standard Screen Sieve and a major portion of the bagasse will be retained on a No. 35 Tyler Standard Screen Sieve; and (g) passing the separated portion of the dehydrated, weathered bagasse through an agitating rotary conveyor and simultaneously spraying a plant nutrient-containing composition into the bagasse while said bagasse is maintained at a temperature of approximately 110° F. to adjust the nutrient content of the bagasse to from about 0.60 to about 1.50 percent by weight nitrogen and a desired amount of phosphorus and potash.

References Cited in the file of this patent
UNITED STATES PATENTS

| | | |
|---|---|---|
| 1,882,377 | Whittelsey | Oct. 11, 1932 |
| 1,944,788 | Genz | Jan. 23, 1934 |
| 1,978,102 | Clapp | Oct. 23, 1934 |
| 2,035,286 | Wenzel | Mar. 24, 1936 |
| 2,351,256 | Fischer | June 13, 1944 |
| 2,498,480 | Bierlich | Feb. 21, 1950 |
| 2,858,647 | Cotton | Nov. 4, 1958 |